United States Patent
Gordon (10) Patent No.: US 9,775,756 B2
(45) Date of Patent: Oct. 3, 2017

(54) WHEELCHAIR STRUCTURE AND SUSPENSION ASSEMBLY

(71) Applicant: NEXT GENERATION MOBILITY PTY LTD, Tugun (AU)

(72) Inventor: Scott Gordon, Tugun (AU)

(73) Assignee: NEXT GENERATION MOBILITY PTY LTD, Tugun Qld (AU)

( * ) Notice: Subject to any disclaimer, the term of this patent is extended or adjusted under 35 U.S.C. 154(b) by 0 days.

(21) Appl. No.: 14/338,613

(22) Filed: Jul. 23, 2014

(65) Prior Publication Data

US 2015/0028559 A1    Jan. 29, 2015

(30) Foreign Application Priority Data

Jul. 24, 2013  (AU) .................................. 2013902731

(51) Int. Cl.
| | |
|---|---|
| A61G 5/10 | (2006.01) |
| B60G 3/02 | (2006.01) |
| B60G 3/20 | (2006.01) |
| A61G 5/02 | (2006.01) |
| A61G 5/04 | (2013.01) |
| B60G 13/00 | (2006.01) |
| B60G 21/05 | (2006.01) |

(52) U.S. Cl.
CPC ................ *A61G 5/10* (2013.01); *A61G 5/02* (2013.01); *A61G 5/04* (2013.01); *A61G 5/1078* (2016.11); *B60G 3/20* (2013.01); *B60G 13/005* (2013.01); *B60G 21/05* (2013.01); *B60G 2200/144* (2013.01); *B60G 2200/445* (2013.01); *B60G 2202/30* (2013.01); *B60G 2204/129* (2013.01); *B60G 2204/13* (2013.01); *B60G 2204/82* (2013.01); *B60G 2204/8302* (2013.01); *B60G 2300/24* (2013.01)

(58) Field of Classification Search
CPC .... A61G 5/10; A61G 2005/1078; B60G 3/02; B60G 3/04; B60G 2204/13; B60G 2204/82; B60G 2300/24; B60G 3/18; B60G 3/20; B60G 21/05
See application file for complete search history.

(56) References Cited

U.S. PATENT DOCUMENTS

| | | | | | |
|---|---|---|---|---|---|
| 2,169,336 | A | * | 8/1939 | Best ......................... | B60G 3/26 267/254 |
| 2,536,769 | A | * | 1/1951 | Rix ........................ | B60G 11/50 267/190 |
| 3,137,513 | A | * | 6/1964 | Marot .................. | B60G 21/007 267/222 |
| 3,292,945 | A | * | 12/1966 | Dangauthier ............ | B60G 3/20 280/124.106 |
| 3,598,385 | A | * | 8/1971 | Parsons, Jr. .............. | B60G 3/26 267/222 |
| 4,455,031 | A | * | 6/1984 | Hosaka .................... | A61G 5/00 180/907 |

(Continued)

FOREIGN PATENT DOCUMENTS

| | | |
|---|---|---|
| EP | 2 277 490 A1 | 1/2011 |
| WO | WO 2012/047844 A1 | 4/2012 |

*Primary Examiner* — Barry Gooden, Jr.
(74) *Attorney, Agent, or Firm* — The Webb Law Firm (57) ABSTRACT

The present invention relates to wheelchair improvements and, in particular, to a wheelchair including a monocoque structural skin according to one aspect, and a suspension assembly according to another aspect.

22 Claims, 3 Drawing Sheets

(56) References Cited

U.S. PATENT DOCUMENTS

| | | | | |
|---|---|---|---|---|
| 4,483,653 A * | 11/1984 | Waite | ............ | B60N 2/245 280/250.1 |
| 4,534,575 A * | 8/1985 | Grove | ............ | B60G 17/005 180/41 |
| 4,542,917 A * | 9/1985 | Waite | ............ | B60N 2/245 280/43.17 |
| 4,740,013 A * | 4/1988 | Pierce, Jr. | ............ | A63H 17/262 280/124.102 |
| 5,364,114 A * | 11/1994 | Petersen | ............ | B60G 3/20 267/248 |
| 5,772,237 A * | 6/1998 | Finch | ............ | A61G 5/06 180/65.1 |
| 5,855,387 A * | 1/1999 | Gill | ............ | A61G 5/10 280/250.1 |
| 6,082,748 A * | 7/2000 | Hartmann | ............ | B60G 3/04 267/248 |
| 6,196,343 B1 * | 3/2001 | Strautnieks | ............ | A61G 5/043 180/22 |
| 6,357,543 B1 * | 3/2002 | Karpik | ............ | B60G 3/20 180/182 |
| 6,357,793 B1 * | 3/2002 | Dickie | ............ | A61G 5/10 16/20 |
| 7,766,106 B2 * | 8/2010 | Puskar-Pasewicz | ... | A61G 5/042 180/24.02 |
| 8,141,890 B2 * | 3/2012 | Hughes | ............ | B60G 21/007 180/210 |
| 8,186,449 B2 * | 5/2012 | Hackert | ............ | A01B 63/16 172/288 |
| 8,480,106 B1 * | 7/2013 | Cohen | ............ | B60G 17/005 180/256 |
| 8,814,186 B1 * | 8/2014 | Rinda | ............ | B62K 5/06 280/124.135 |
| 2003/0205878 A1 * | 11/2003 | Martis | ............ | A61G 5/045 280/124.111 |
| 2004/0004316 A1 * | 1/2004 | Robertson | ............ | B60G 3/20 267/64.26 |
| 2004/0262859 A1 * | 12/2004 | Turturiello | ............ | A61G 5/042 280/5.515 |
| 2005/0006878 A1 * | 1/2005 | Laffin | ............ | A61G 5/14 280/642 |
| 2005/0077715 A1 * | 4/2005 | Mulhern | ............ | A61G 5/042 280/755 |
| 2005/0121961 A1 * | 6/2005 | Beauchesne | ............ | A61G 5/10 297/353 |
| 2005/0151360 A1 * | 7/2005 | Bertrand | ............ | A61G 5/043 280/755 |
| 2006/0076748 A1 * | 4/2006 | Pauls | ............ | A61G 5/043 280/124.11 |
| 2006/0091591 A1 * | 5/2006 | Robertson | ............ | B60G 3/20 267/64.26 |
| 2006/0097562 A1 * | 5/2006 | Hiruta | ............ | A61F 5/3792 297/467 |
| 2007/0151780 A1 * | 7/2007 | Tonoli | ............ | B60G 17/015 180/65.1 |
| 2007/0182120 A1 * | 8/2007 | Tonoli | ............ | B60G 17/015 280/124.142 |
| 2009/0166996 A1 * | 7/2009 | Spindle | ............ | A61G 5/00 280/250.1 |
| 2010/0004820 A1 * | 1/2010 | Bekoscke | ............ | A61G 5/043 701/38 |
| 2010/0084209 A1 * | 4/2010 | Bekoscke | ............ | A61G 5/043 180/209 |
| 2010/0123296 A1 | 5/2010 | Chelgren | | |
| 2011/0298191 A1 * | 12/2011 | Pozio | ............ | B60G 3/20 280/124.116 |
| 2012/0299262 A1 * | 11/2012 | Bekoscke | ............ | A61G 5/043 280/124.133 |
| 2013/0300083 A1 * | 11/2013 | Borisoff | ............ | A61G 5/10 280/250.1 |
| 2013/0306383 A1 * | 11/2013 | Mulhern | ............ | A61G 5/045 180/6.5 |

* cited by examiner

WHEELCHAIR STRUCTURE AND SUSPENSION ASSEMBLY

The present invention relates generally to wheelchair improvements and, in particular, to a wheelchair monocoque structure and a non-drive wheel suspension assembly.

BACKGROUND OF THE INVENTION

Wheelchairs are an important means of transportation for a significant portion of society. Whether manual or powered, wheelchairs provide an important degree of independence for those they assist. However, this degree of independence can be limited if the wheelchair is required to traverse obstacles such as, for example, curbs that are commonly present at sidewalks, driveways, and other paved surface interfaces.

In this regard, most wheelchairs have front and/or rear casters to stabilize the chair from tipping forward or backward and to ensure that the drive wheels are always in contact with the ground. On such wheelchairs, the caster wheels are typically much smaller than the driving wheels and located forward and/or rear of the drive wheels. Though this configuration provides the wheelchair with greater stability, it makes it difficult for such wheelchairs to climb over obstacles such as, for example, curbs or the like, because the casters cannot be driven over the obstacle due to their small size and general inability to become vertically misaligned with the drive wheel level or with the level of an associated caster wheel.

The Applicant has recognised the need for a wheelchair of the type having drive wheels and suspended front and/or rear caster wheels having improved stability particularly when traversing over uneven ground or obstacles. The Applicant has further recognised the need for improving rigidity and strength in the overall wheelchair structure while maintaining the wheelchair's ability to accommodate essential components including a caster wheel assembly, battery box and other components that may be necessary to drive the wheelchair.

Any discussion of documents, acts, materials, devices, articles or the like, which has been included in the present specification is solely for the purpose of providing a context for the present invention. It should not be taken as an admission that any or all of the previous discussion forms part of the prior art base or was common general knowledge in the field of the invention as it existed before the priority date of any of the claims herein.

SUMMARY OF THE INVENTION

In one aspect, the present invention provides a suspension assembly for one or more non-drive wheels of a wheelchair, the wheelchair including a main body and at least one drive wheel, said suspension assembly including:
a linkage support structure including a horizontal axis, said linkage support structure associated with the wheelchair main body;
at least two linkages extending upwardly and outwardly from a left and right side of said linkage support structure, each linkage being pivotably connected at a first end to said linkage support structure, wherein a first of said at least two linkages is disposed vertically higher than a second of said at least two linkages; and
a left and right non-drive wheel suspended from a respective left and right non-drive wheel support member, each non-drive wheel support member including a horizontal axis, wherein a second end of each left side linkage is pivotably connected to said left non-drive wheel support member and a second end of each right side linkage is pivotably connected to said right non-drive wheel support member, and wherein a first of said at least two linkages is disposed and connected vertically higher than a second of said at least two linkages such that the horizontal axes of the linkage support structure and non-drive wheel support members is maintained in parallel alignment.

The skilled addressee would appreciate that the suspension assembly defined according to an aspect above allows for greater freedom of movement of each non-drive wheel by way of rotation of the linkages relative to the linkage support structure and hence wheelchair body, to provide each non-drive wheel with independent ability to move substantially vertically with respect to each other and to the drive wheels. A wheelchair incorporating the suspension assembly is able to traverse more easily and with greater stability over uneven ground or obstacles.

In using a vertically disposed linkage to connect each non-drive wheel support member with the linkage support structure, each non-drive wheel support member is maintained in an orientation corresponding with that of the linkage support structure and hence the wheelchair body. When one of the drive wheels is elevated, for example, this causes the horizontal axis of the linkage support structure to also become angled, and the horizontal axis of each non-drive wheel support member will adopt a similar angle notwithstanding the vertical disposition of each member. This ensures that each drive wheel and non-drive wheel is correspondingly oriented and that the non-drive wheels can continue to spin straight through their respective bearings. When neither or both of the drive wheels is elevated, the horizontal axis of the linkage support structure remains horizontal, as does the horizontal axis of each non-drive wheel support member. In this configuration, if one or both of the non-drive wheels should become vertically disposed, this parallel horizontal axis alignment is still maintained.

The drive wheel(s) and non-drive wheels thus remain grounded at all times, ensuring weight is distributed across all wheels regardless of whether one wheel is disposed vertically with respect to another. The shock absorber provides the necessary means of absorbing and counteracting forces associated with the substantially vertical movement of each non-drive wheel member resulting from traversing over uneven ground or obstacles.

In an embodiment, the suspension assembly further includes a means of self-leveling the non-drive wheels after having been vertically disposed, said means of self-levelling being in a normally extended or biased configuration when neither of the non-drive wheels is vertically disposed with respect to one another. This ensures that when a left non-drive wheel is raised as a result of the ground surface beneath the left wheel being elevated, for example, the means of self-leveling becomes compressed and thereby enables the left non-drive wheel to return to its original position when the ground surface under the left wheel becomes level again. In this manner, the suspension assembly adapts to the surface upon which it is traversing and ensures wheel contact is maintained.

In an embodiment, the means of self-leveling is in the form of a shock absorber pivotably connected between a left and right linkage.

The "substantially vertical movement" or "vertical disposition" of each non-drive wheel and support member therefor, as described herein, is in fact a rotational movement of these components relative to the linkage support member.

However, because the extent of rotation is minimal, the movement has been described herein as a "substantially vertical movement" or a "vertical disposition".

In an embodiment, each linkage is of a curved shape and is oriented such that the curve extends upwardly and outwardly from said linkage support structure such that each non-drive wheel support member is disposed vertically higher than the linkage support structure.

In an embodiment, said wheelchair body includes a longitudinal axis extending along a forward/backward direction of travel of the wheelchair, and said linkage support structure extends rearwardly from said wheelchair body along an axis parallel with said longitudinal axis, the linkage support structure including two vertically disposed, transverse tabs which provide a connecting surface for said linkage first ends.

In an embodiment, said linkage support structure is a tubular suspension arm or beam, and each tab extends through side wall slots in said beam, the tabs being of a length such that ends thereof extend outwardly from said beam side walls.

In an embodiment, said tabs are also welded to the tubular beam.

In an embodiment, the first end of each first linkage is bolted to an upper of said vertically disposed tabs and the first end of each second linkage is bolted to the lower of the tabs such that each bolt acts as a pivot pin for the corresponding linkage.

In an embodiment, each non-drive wheel support member includes a base section from which the wheel is suspended and an upright section having two vertically disposed, transverse tabs associated therewith.

In an embodiment, the second end of each first linkage is bolted to an upper of said vertically disposed tabs and the second end of each second linkage is bolted to the lower of the tabs such that each bolt acts as a pivot pin for the corresponding linkage.

In an embodiment, there are three linkages connecting the linkage support structure to each non-drive wheel support member, each linkage being spaced apart along said longitudinal axis and comprising of two lower linkages and one elevated linkage therebetween, wherein each of the linkage support structure and non-drive wheel support members include a corresponding number and arrangement of tabs.

In an embodiment, each said tab defined above includes a pair of spaced tabs adapted to accommodate a linkage end there between.

In an embodiment, the shock absorber extends transversely and includes a cylinder which houses a moveable piston configured to extend and retract out from one end of the cylinder, wherein the piston is pivotably connected at its free end to the first linkage disposed left of the linkage support structure, and the cylinder is pivotably connected at its non-piston end to the first linkage disposed right of the linkage support structure, the piston being biased towards its extended position to enable either linkage to self-level after being disposed by uneven ground or obstacles which caused the piston to retract into the cylinder.

In an alternate embodiment, the shock absorber extends transversely and includes a cylinder which houses a moveable piston configured to extend and retract out from one end of the cylinder, wherein the piston is pivotably connected at its free end to the first linkage disposed right of the linkage support structure, and the cylinder is pivotably connected at its non-piston end to the first linkage disposed left of the linkage support structure, the piston being biased towards its extended position to enable either linkage to self-level after being disposed by uneven ground or obstacles which caused the piston to retract into the cylinder.

In an embodiment, each of the first linkages includes a horizontally aligned tab to which either the shock absorber cylinder or piston is bolted such that each bolt acts as a pivot pin for the cylinder or piston.

In an embodiment, each non-drive wheel is a caster wheel of smaller diameter to that of the one or more drive wheels.

In another aspect, the present invention provides a manual or powered wheelchair incorporating a suspension assembly as defined in the preceding paragraphs.

In another aspect, the present invention provides a monocoque wheelchair structure.

In a further aspect, the present invention provides a monocoque wheelchair structure including drive wheels, the structure including a suspension arm configured to accommodate a non-drive wheel suspension assembly rearwardly of the drive wheels.

In yet another aspect, the present invention provides a load-bearing, monocoque structural skin for a powered wheelchair including:
a base surface;
upright side wall surfaces associated with said base surface and configured to accommodate a drive wheel axle for said wheelchair drive wheels; and
an upper surface associated with said side wall surfaces for supporting a chair, wherein said base, side wall and upper surfaces define a compartment for housing at least a battery for driving said drive wheels.

The skilled addressee would appreciate that the monocoque structural skin which may incorporate a battery box and other components for powering the wheelchair provides significantly increased strength and rigidity to the wheelchair while reducing the weight of the wheelchair and removing the need for a frame or chassis.

In an embodiment, said base surface includes suspension arm or beam extending along an underside of said base surface towards a rear of the monocoque structure, said suspension arm configured to accommodate a non-drive wheel suspension assembly rearwardly of the drive wheels.

In an embodiment, the non-drive wheel suspension assembly is configured as defined in the preceding paragraphs.

BRIEF DESCRIPTION OF THE DRAWINGS

The present invention will now be described with reference to the accompanying drawings which illustrate exemplary embodiments of the present invention, wherein.

DETAILED DESCRIPTION OF EMBODIMENT(S) OF THE INVENTION

The following detailed description of the invention refers to the accompanying Figures. Although the description includes exemplary embodiments, other embodiments are possible, and changes may be made to the embodiments described without departing from the spirit and scope of the invention. Wherever possible, the same reference numbers are used throughout the embodiments and the following description to refer to the same and like parts.

Figure 1:
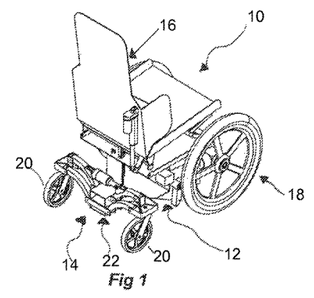
FIG. 1 is a rear perspective view of a wheelchair including a monocoque structure according to an embodiment and a non-drive wheel suspension assembly according to an embodiment.
Figures 2, 3, 5, 6:
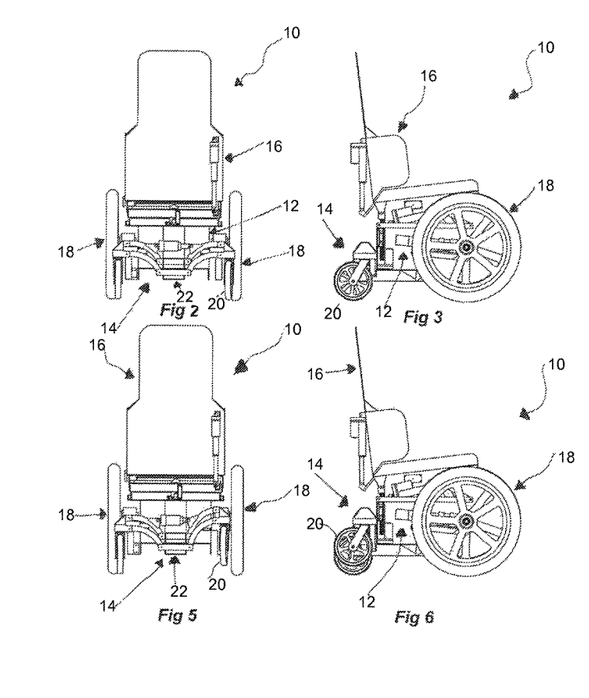
FIG. 2 is a rear view of the wheelchair of FIG. 1.
FIG. 3 is a side view of the wheelchair of FIG. 1.
FIG. 5 is a rear view of the wheelchair of FIG. 3.
FIG. 6 is a side view of the wheelchair of FIG. 3.

FIGS. 1-3 illustrate a wheelchair 10 incorporating a monocoque structure 12 according to an embodiment and also a rear non-drive wheel suspension assembly 14 according to an embodiment. In addition, the wheelchair includes a chair 16, two drive wheels 18 (although some wheelchairs may be configured with one, or more than two, drive wheels), and various components associated with the chair and drive wheels that are not described in detail herein on the basis that their configuration and use is largely known.

The non-drive wheels 20 which form part of the suspension assembly 14 may be referred to herein as "caster wheels" 16, however, this is not intended to limit the scope of the invention to the non-drive wheels being of the caster wheel variety. Indeed, the non-drive wheels may be any appropriate type of wheel. Furthermore, reference to a "longitudinal axis" herein is intended to mean any axis that is aligned with or extends parallel to the central axis defined by a straight forward/backward direction of travel of the wheelchair 10.

An advantage of incorporating the suspension assembly 14 embodied herein into a wheelchair design is the stability afforded by the wheelchair when traversing over obstacles or uneven ground and the like. The added stability is a result of the non-drive wheels' 20 ability to become vertically disposed with respect to one another and also with respect to the drive wheels 18, as shown by way of example in FIGS. 4-6. All wheels are configured to contact the ground at all times, notwithstanding the contour of the ground upon which the wheelchair traverses.

Figure 4:
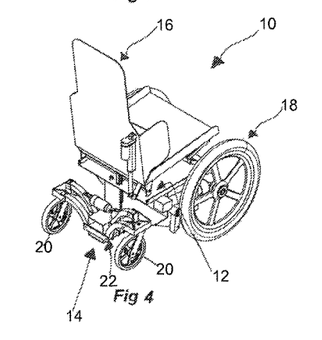
FIG. 4 is a rear perspective view of the wheelchair of FIG. 1 including an elevated non-drive wheel.

For example, FIGS. 3 and 4 demonstrate a scenario in which a wheelchair 10 has two drive wheels 20 and two rearwardly disposed non-drive wheels 16, wherein the ground surface height is greater beneath the rear, right hand side non-drive wheel 16 but level beneath all other wheels. It is evident from these illustrations that the right non-drive wheel has the ability to be raised with respect to the left non-drive wheel and also the drive wheels 20. Such a configuration affords the wheelchair the ability to have weight distributed across all four wheels, even when traversing over uneven ground.

The non-drive wheel suspension assembly 14 is shown in closer detail in FIGS. 5-8. The assembly 14 may include a linkage support structure 22 which is configured for attachment to a wheelchair structure, such as structure 12. In the embodiment shown, this structure is in the form of a tubular suspension arm or beam 24 configured as a rearward extension of the structure 12. In particular, in the embodiment shown, the arm 24 is attached to an underside of the structure 12 and extends a short distance rearwardly for supporting other components of the assembly 14. In an embodiment, the structure 22 may include an additional tubular arm or beam 26 disposed above the main arm 24 at or adjacent a rearward end for purposes described below. Alternatively, these two components may be integrally formed.

The suspension assembly 14 may further include a plurality of linkages 28 pivotably connected at one end to the linkage support structure 22 and extending upwardly and outwardly therefrom, that is, towards left and right hand sides of the structure 22. Each plurality of linkages 28 is responsible for coupling respective left and right non-drive wheels 16 to the linkage support structure 22, and affording the wheels the ability to become vertically disposed with respect to the structure 22 and, thereby, with respect to the wheelchair structure 12 and drive wheels 18. In an embodiment, each non-drive wheel 16 is suspended from a respective non-drive wheel support member 30 to which the free end of each plurality of linkages 28 is pivotably connected.

In the embodiment shown, each non-drive wheel support member 30 is disposed higher than the support arm 22 and this relationship is maintained at all times. In an embodiment, this is achieved through use of a shock absorber 32 which pivotably connects the left and right plurality of linkages and allows rotation of the linkages relative to the support structure 22, to an extent allowed by full expansion or retraction of a piston 34 housed inside the shock absorber cylinder 36. The skilled addressee would appreciate that the shock absorber not only absorbs shock and impact resulting from the vertical disposition of the wheels, but also self-levels the non-drive wheels after they have become vertically disposed. In particular, the shock absorber is configured to provide a biased force to maintain the linkages in a spaced apart "level" configuration, but is forced to compress when either one of the non-drive wheels is raised as a result of the contour of the ground surface or some other obstacle. The biased configuration ensures the linkage and hence the wheel moves back to its original position after the contour or obstacle has been traversed, thereby causing a self-leveling of the wheels. The suspension thus adapts to the surface upon which the wheelchair is travelling. Additional features of a shock absorber 32 according to an embodiment are described in more detail below.

Each plurality of linkages 28 extending on either side of the support arm 22 may include at least a lower linkage 38 and an upper linkage 40 that is vertically disposed from the lower linkage 38. In the embodiment shown, each plurality of linkages 28 also includes a third linkage 42 disposed at the same height as lower linkage 38, such that all three linkages are spaced apart along a longitudinal axis with the upper linkage 40 disposed between the lower linkages 38 and 42. It is to be understood that any additional number of linkages may be used and that other orientations may be effective.

The linkage support structure 22 and the non-drive wheel support members 30 may each include a respective plurality of tabs 44 and 46 which each provide one or more surfaces for pivotably connecting the linkages. For example, in the embodiment shown, each plurality of tabs 44 and 46 includes a pair of spaced apart tabs configured to accommodate a linkage end therebetween, wherein the tabs and linkage ends include co-aligned apertures to accommodate a bolt or other shaft-like component (these components not being numbered in each Figure for the purpose of brevity) which may act as a pivot pin. It is to be understood that the means of enabling each linkage to pivot is not to be limited to the means described and depicted in the Figures.

According to an embodiment, each plurality of tabs 44 associated with the linkage support structure 22 is orientated to accommodate the linkages according to the linkage orientation. For example, in the embodiment shown, the plurality of tabs 44 include two lower tab pairs for accommodating the lower linkages 38 and 42, and one higher tab pair for accommodating higher linkage 40. Similarly, according to an embodiment, each plurality of tabs 46 associated with each non-drive wheel support member 30 includes two lower tab pairs for accommodating the lower linkages 38 and 42, and one higher tab pair for accommodating the higher linkage 40.

Figure 7:
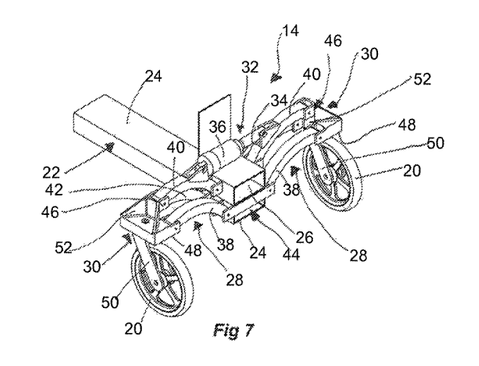
FIG. 7 is an enlarged rear perspective view of a non-drive wheel suspension assembly according to an embodiment.
Figure 8:
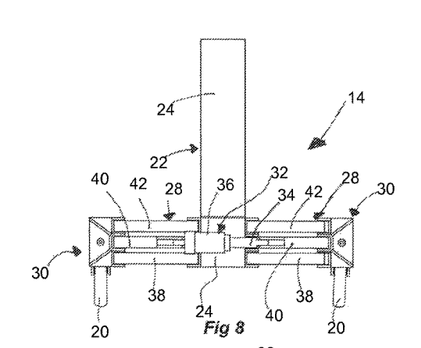
FIG. 8 is a top view of the non-drive wheel suspension assembly of FIG. 5.
Figure 9:
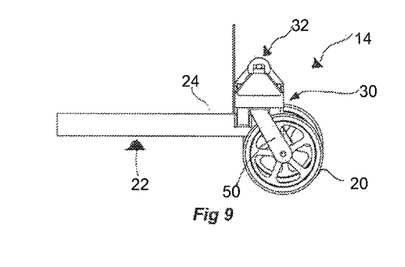
FIG. 9 is a side view of the non-drive wheel suspension assembly of FIG. 5.

In the embodiment shown, the plurality of tabs 44 associated with the linkage support structure 22 either extend transversely through slots in the structure or are attached to the end of the structure, as shown most clearly in FIG. 7. In an embodiment, these tabs 44 are welded to the structure 22. It is to be understood however that other means for associating the tabs 44 and 46 with the linkage support structure 22 and non-drive wheel support members 30 respectively could be implemented.

Each non-drive wheel member 30 may include a base section 48 from which a wheel bearing holder 50 is suspended, each non-drive wheel 20 configured for rotation about the held bearing (not shown), and with which may be associated the lower tab pairs for accommodating lower linkages 38 and 42, and an upright section 52 with which may be associated the upper tab pair for accommodating upper linkage 40. An example of such a non-drive wheel member 30 is embodied in at least FIGS. 7-10. The wheel bearing holder 50 and hence the wheel 20 held by it may be rotatable about a vertical axis, as per common caster wheel configurations.

The skilled addressee would appreciate that in using at least two pivotable linkages that are vertically disposed in the manner described, that is to connect each non-drive wheel support member 30 to the linkage support structure 22, each non-drive wheel support member 30 is maintained in an orientation corresponding with that of the linkage support structure and hence the rest of the wheelchair structure or body. Therefore, in an instance where one of the drive wheels 18 is elevated, for example, the normally horizontally oriented linkage support structure 22 may become slightly angled, and the linkage arrangement causes the horizontal orientation of each non-drive wheel support member 30 to adopt a similar angle.

Figure 10:
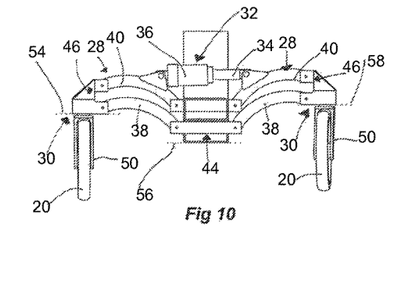
FIG. 10 is a rear view of the non-drive wheel suspension assembly of FIG. 5.
Figure 11:
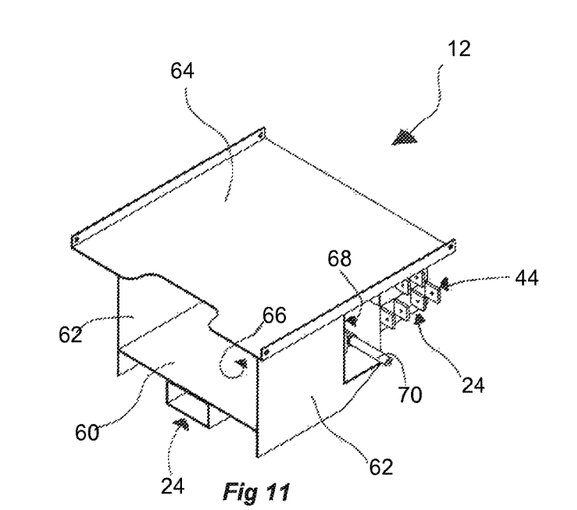
FIG. 11 is a front perspective view of a wheelchair monocoque structure according to an embodiment.
Figure 12:
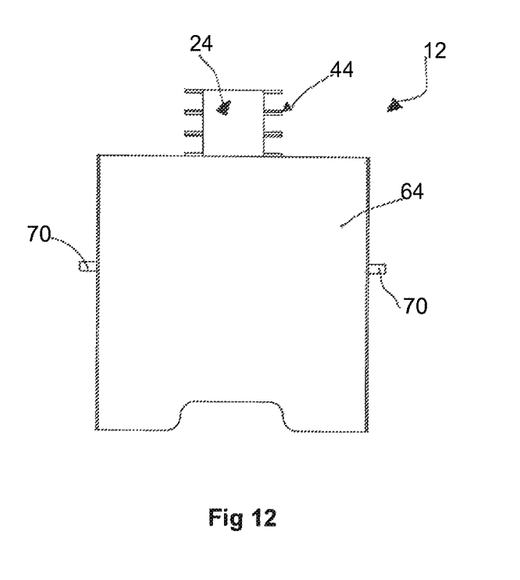
FIG. 12 is a top view of the wheelchair monocoque structure of FIG. 9.
Figure 13:
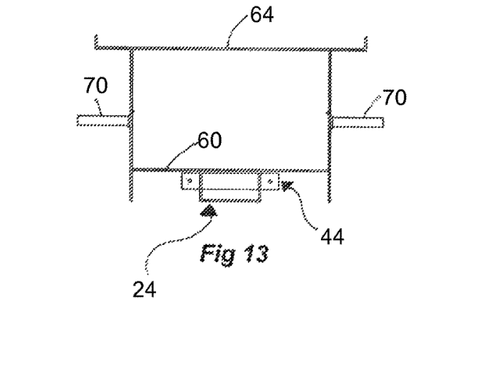
FIG. 13 is a front view of the wheelchair monocoque structure of FIG. 9.
Figure 14:
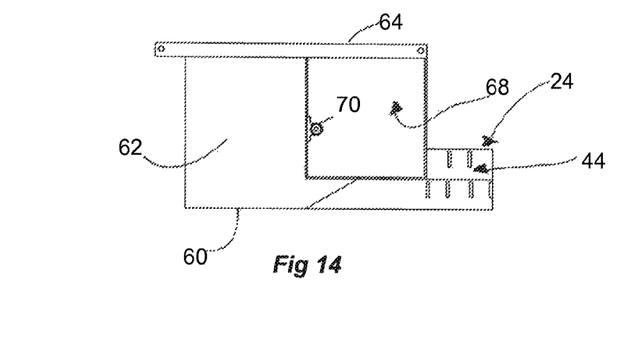
FIG. 14 is a side view of the wheelchair monocoque structure of FIG. 9.

The corresponding orientation of these components can be appreciated in FIG. 10 which shows that even when a rear non-drive wheel is elevated, a horizontal axis 54, 56 and 58 associated with each of a left non-drive wheel support member 30, the linkage support structure 22, and a right non-drive wheel support member 30 respectively, remain in a parallel relationship. This relationship is maintained regardless of which of the four wheels becomes disposed due to uneven ground or obstacles. The drive wheels 18, which are generally of larger diameter compared with the non-drive wheels 20, need not be independently moveable with respect to each other but may indeed be configured like so.

The drive wheel(s) and non-drive wheels thus remain grounded at all times, ensuring weight is distributed across all wheels regardless of whether one wheel is disposed vertically with respect to another. The shock absorber 32, as well as providing a minimum and maximum range of rotation of the linkages and the associated self-leveling effect, provides the necessary means of absorbing and counteracting forces associated with such movement. In the embodiments shown, the shock absorber is of the type including a cylinder 36 and moveable piston 34 configured to extend and retract out from one end of the cylinder 36, wherein the piston is pivotably connected at its free end to an upper linkage 40, and the cylinder is pivotably connected at its non-piston end to the upper linkage 40 on the opposed side of the linkage support structure 22. It is to be understood that other shock absorbing means could equally be used.

While the embodiments shown and described herein relate to a wheelchair having non-drive wheels disposed rearwardly of the drive wheels, it is considered within the scope of the invention to propose a suspension assembly and associated non-drive wheels disposed at the front of the wheelchair, or indeed in any other configuration such that the load is balanced between the drive and non-drive wheels.

The monocoque structure 12 of the wheelchair 10, according to an embodiment, is shown in closer detail in FIGS. 11-14 where it can be appreciated that the structure 12 provides a single load bearing structural skin which accommodates the wheelchair drive wheels 18 and is intended to replace a conventional wheelchair frame or chassis.

The structure 12 may be substantially box-like in shape and include a base surface 60, upright side wall surfaces 62, and an upper surface 64 above which is adapted to be supported a chair for the wheelchair driver, such as chair 16 shown in earlier Figures. Not only does the structure 12 significantly increase strength and rigidity of the wheelchair 10, it also reduces the overall weight of the wheelchair. Furthermore, the structure 12 may be designed to provide at least one compartment 66, for example, the area defined by the base, side wall and upper surfaces 60, 62 and 64, for supporting components such as those necessary to drive the wheelchair (when powered) such as as battery boxes and the like, or any other components or goods.

The structure 12 shown in the embodiment of FIGS. 11-14 includes a compartment 66 designed specifically for supporting a battery box (not shown), and includes a second rearward compartment 68 for housing other componentry such as controls and processors (not shown). The drive wheels 18 are rotatable about drive wheel shafts 70 extending through side walls 62 of the structure 12 between the first and second compartments, but it is to be understood that other configurations are possible. For example, a single drive wheel axle (not shown) may extend all the way through the structure 12.

Should the wheelchair 10 include or require front and/or rear non-drive wheels, such as the wheelchair 10 including rear non-drive wheels depicted in earlier Figures, the monocoque structure 12 may easily accommodate the non-drive wheels or suspension assembly therefor. For example, suspension assembly 14 which is already described herein may be connected to the wheelchair structure 10 by attaching (for example, welding) a suspension arm 24 to an underside of base surface 60 such that the arm extends rearwardly of the structure to accommodate necessary non-drive wheel and/or suspension components.

It is to be understood that the monocoque structure 12 may include other surfaces, such as a rear surface or a surface separating compartments, according to the requirements of the wheelchair 10, and that the size and/or shape of compartments may be configured accordingly.

Throughout this specification and claims which follow, unless the context requires otherwise, the word "comprise", and variations such as "comprises" and "comprising", will be understood to imply the inclusion of a stated integer or step, or group of integers or steps, but not the exclusion of any other integer or step or group of integers or steps.

The reference to any prior art in this specification is not, and should not be taken as, an acknowledgement or any suggestion that the prior art forms part of the common general knowledge in Australia.

The invention claimed is:

1. A suspension assembly for wheels of a wheelchair, the wheelchair including a wheelchair frame having a longitudinal axis and at least one drive wheel, the longitudinal axis extending from a front, central portion of the wheelchair frame to a rear, central portion of the wheelchair frame such that the longitudinal axis extends along a forward/backward direction of travel of said wheelchair, said suspension assembly including:
   a linkage support structure associated with the wheelchair frame;
   at least two linkages extending upwardly and transversely outwardly from each of opposed left and right sides of said linkage support structure, each of the left and right side linkages being pivotably connected at a first end thereof to said linkage support structure in a configuration that enables the left and right side linkages to be independently pivotable with respect to one another, and wherein axes of rotation associated with the pivotable connection between the first ends of each of the left and right side linkages and the linkage support structure extend along or parallel to said longitudinal axis; and
   a left and right wheel suspended substantially downwardly and perpendicularly from a respective left and right wheel support member, wherein a second end of each of said left side linkages is pivotably connected to said left wheel support member and a second end of each of said right side linkages is pivotably connected to said right wheel support member, and wherein at least one of said at least two linkages extending from each of the left and right hand sides of the linkage support structure is disposed vertically higher than a second of said at least two linkages such that when any one or both of the left and right wheels encounters a surface that causes relative vertical movement between the corresponding wheel support member and the linkage support structure, the corresponding wheel support member maintains an orientation in which the suspended wheel remains in said substantially downward and perpendicular suspension.

2. A suspension assembly according to claim 1, wherein each linkage is of a curved shape and is oriented such that the curve extends upwardly and transversely outwardly from said linkage support structure such that each said wheel support member is disposed vertically higher than the linkage support structure.

3. A suspension assembly according to claim 1, wherein each of the linkage support structure and the left and right wheel support members is oriented substantially horizontally along respective transverse axes in said first position, said linkages causing each of said respective transverse axes to remain in a substantially parallel relationship when either one of the wheel support members moves after the any one of the wheels encounters the surface that causes the relative vertical movement between the linkage support structure and the left or right wheel support members.

4. A suspension assembly according to claim 3, wherein said wheelchair includes two wheels disposed at a front of the wheelchair on the left and right sides of the structural component, and the linkage support structure extends rearwardly from the structural component to support said left and right wheel support members via said linkages.

5. A suspension assembly according to claim 4 wherein said front wheels are drive wheels, and rear wheels connected to the wheel support members are non-drive wheels.

6. A suspension assembly according to claim 1, further including a means of self-leveling the suspended wheels after having been vertically disposed.

7. A suspension assembly according to claim 6, wherein said means of self-levelling is in a fully extended or biased configuration when neither of the suspended wheels is vertically disposed such that when one of the wheels becomes vertically disposed, the means of self-levelling will cause the wheel to be moved back to an original position once allowed to do so.

8. A suspension assembly according to claim 7, wherein the means of self-leveling is in the form of a shock absorber pivotably connected between the left and right linkage.

9. A suspension assembly according to claim 8, wherein the shock absorber extends transversely and includes a cylinder which houses a moveable piston configured to extend and retract out from one end of the cylinder, wherein the piston is pivotably connected at a free end to the first linkage disposed left of the linkage support structure, and the cylinder is pivotably connected at a closed end to the first linkage disposed right of the linkage support structure.

10. A suspension assembly according to claim 1, wherein the linkage support structure includes two vertically disposed, transverse tabs which provide a connecting surface for said linkage first ends, wherein the first end of each first linkage is pivotably connected to an upper of said vertically disposed tabs and the first end of each second linkage is pivotably connected to the lower of the tabs.

11. A suspension assembly according to claim 10, wherein each said wheel support member includes a base section from which the wheel is suspended and an upright section having two vertically disposed, transverse tabs, wherein the second end of each first linkage is pivotably connected to an upper of said vertically disposed tabs and the second end of each second linkage is pivotably connected to the lower of the tabs.

12. A suspension assembly according to claim 11, wherein the suspension assembly includes three linkages connecting the linkage support structure to each of the left and right wheel support members, each said linkage being spaced apart along said longitudinal axis and including two lower linkages and one elevated linkage disposed there between, wherein each of the linkage support structure and wheel support members includes a corresponding number and arrangement of tabs.

13. A suspension assembly according to claim 12, wherein each said tab includes a pair of spaced tab portions adapted to accommodate a linkage end therebetween.

14. A manual or powered wheelchair incorporating a suspension assembly according to claim 1.

15. A wheelchair according to claim 14 further including a load-bearing, monocoque structural skin.

16. A wheelchair according to claim 15, wherein said wheelchair is an electrically powered wheelchair and said monocoque structural skin includes:
   a base surface;
   upright side wall surfaces associated with said base surface and configured to accommodate at least one drive wheel axle for wheelchair drive wheels; and
   an upper surface associated with said side wall surfaces for supporting a chair, wherein said base surface, said side wall surfaces and said upper surface define a compartment for housing at least a battery for electrically driving said drive wheels.

17. A wheelchair according to claim 16, wherein said base surface includes the linkage support structure extending along an underside of said base surface towards a rear of the monocoque structural skin.

18. A suspension assembly for one or more wheels of a wheelchair, the wheelchair including a structural component having a longitudinal axis extending along a forward/backward direction of travel of the wheelchair and at least one drive wheel, said suspension assembly including:
 a linkage support structure associated with the wheelchair structural component and extending along or parallel to said longitudinal axis;
 at least two linkages extending upwardly and transversely outwardly from each of opposed left and right sides of said linkage support structure, each of the left and right side linkages being independently pivotably connected at a first end to said linkage support structure;
 a left and right wheel suspended substantially downwardly and perpendicularly from a respective left and right wheel support member, wherein a second end of each of said left side linkages is pivotably connected to said left wheel support member and a second end of each of said right side linkages is pivotably connected to said right wheel support member, and wherein at least one of said at least two linkages extending from each of the left and right hand sides of the linkage support structure is disposed vertically higher than a second of said at least two linkages such that when any one or both of the left and right wheels encounters a surface that causes relative vertical movement between the corresponding wheel support members and the linkage support structure, the corresponding wheel support members maintains an orientation in which the suspended wheel remains in said substantially downward and perpendicular suspension;
 further including a means of self-leveling the suspended wheels after having been vertically disposed;
 wherein said means of self-levelling is in a fully extended or biased configuration when neither of the suspended wheels is vertically disposed such that when one of the wheels becomes vertically disposed, the means of self-levelling will cause the wheel to be moved back to an original position once allowed to do so;
 wherein the means of self-leveling is in the form of a shock absorber pivotably connected between the left and right linkage; and
 wherein the shock absorber extends transversely and includes a cylinder which houses a moveable piston configured to extend and retract out from one end of the cylinder, wherein the piston is pivotably connected at a free end to the first linkage disposed left of the linkage support structure, and the cylinder is pivotably connected at a closed end to the first linkage disposed right of the linkage support structure.

19. A suspension assembly for one or more wheels of a wheelchair, the wheelchair including a structural component having a longitudinal axis extending along a forward/backward direction of travel of the wheelchair and at least one drive wheel, said suspension assembly including:
 a linkage support structure associated with the wheelchair structural component and extending along or parallel to said longitudinal axis;
 at least two linkages extending upwardly and transversely outwardly from each of opposed left and right sides of said linkage support structure, each of the left and right side linkages being independently pivotably connected at a first end to said linkage support structure;
 a left and right wheel suspended substantially downwardly and perpendicularly from a respective left and right wheel support member, wherein a second end of each of said left side linkages is pivotably connected to said left wheel support member and a second end of each of said right side linkages is pivotably connected to said right wheel support member, and wherein at least one of said at least two linkages extending from each of the left and right hand sides of the linkage support structure is disposed vertically higher than a second of said at least two linkages such that when any one or both of the left and right wheels encounters a surface that causes relative vertical movement between the corresponding wheel support members and the linkage support structure, the corresponding wheel support members maintains an orientation in which the suspended wheel remains in said substantially downward and perpendicular suspension;
 further including a means of self-leveling the suspended wheels after having been vertically disposed;
 wherein said means of self-levelling is in a fully extended or biased configuration when neither of the suspended wheels is vertically disposed such that when one of the wheels becomes vertically disposed, the means of self-levelling will cause the wheel to be moved back to an original position once allowed to do so;
 wherein the means of self-leveling is in the form of a shock absorber pivotably connected between the left and right linkage; and
 wherein the shock absorber extends transversely and includes a cylinder which houses a moveable piston configured to extend and retract out from one end of the cylinder, wherein the piston is pivotably connected at a free end to the first linkage disposed right of the linkage support structure, and the cylinder is pivotably connected at a closed end to the first linkage disposed left of the linkage support structure.

20. A suspension assembly for one or more wheels of a wheelchair, the wheelchair including a structural component having a longitudinal axis extending along a forward/backward direction of travel of the wheelchair and at least one drive wheel, said suspension assembly including:
 a linkage support structure associated with the wheelchair structural component and extending along or parallel to said longitudinal axis;
 at least two linkages extending upwardly and transversely outwardly from each of opposed left and right sides of said linkage support structure, each of the left and right side linkages being independently pivotably connected at a first end to said linkage support structure;
 a left and right wheel suspended substantially downwardly and perpendicularly from a respective left and right wheel support member, wherein a second end of each of said left side linkages is pivotably connected to said left wheel support member and a second end of each of said right side linkages is pivotably connected to said right wheel support member, and wherein at least one of said at least two linkages extending from each of the left and right hand sides of the linkage support structure is disposed vertically higher than a second of said at least two linkages such that when any one or both of the left and right wheels encounters a surface that causes relative vertical movement between the corresponding wheel support members and the linkage support structure, the corresponding wheel support members maintains an orientation in which the suspended wheel remains in said substantially downward and perpendicular suspension;

wherein the linkage support structure includes two vertically disposed, transverse tabs which provide a connecting surface for said linkage first ends, wherein the first end of each first linkage is pivotably connected to an upper of said vertically disposed tabs and the first end of each second linkage is pivotably connected to the lower of the tabs;

wherein each said wheel support member includes a base section from which the wheel is suspended and an upright section having two vertically disposed, transverse tabs, wherein the second end of each first linkage is pivotably connected to an upper of said vertically disposed tabs and the second end of each second linkage is pivotably connected to the lower of the tabs; and wherein the suspension assembly includes three linkages connecting the linkage support structure to each of the left and right wheel support members, each said linkage being spaced apart along said longitudinal axis and including two lower linkages and one elevated linkage disposed there between, wherein each of the linkage support structure and wheel support members includes a corresponding number and arrangement of tabs.

21. A suspension assembly according to claim 20, wherein each said tab includes a pair of spaced tab portions adapted to accommodate a linkage end therebetween.

22. A suspension assembly for wheels of a wheelchair, the wheelchair including a wheelchair frame having a longitudinal axis and at least one drive wheel, the longitudinal axis extending from a front, central portion of the wheelchair frame to a rear, central portion of the wheelchair frame such that the longitudinal axis extends along a forward/backward direction of travel of said wheelchair, said suspension assembly including:

a linkage support structure associated with the wheelchair frames;

at least two linkages extending upwardly and transversely outwardly from each of opposed left and right sides of said linkage support structure, each of the left and right side linkages being pivotably connected at a first end thereof to said linkage support structure in a configuration that enables the left and right side linkages to be independently pivotable with respect to one another, and wherein axes of rotation associated with the pivotable connection between the first ends of each of the left and right side linkages and the linkage support structure extend along or parallel to said longitudinal axis;

a left and right wheel suspended substantially downwardly and perpendicularly from a respective left and right wheel support member, wherein a second end of each of said left side linkages is pivotably connected to said left wheel support member and a second end of each of said right side linkages is pivotably connected to said right wheel support member, and wherein at least one of said at least two linkages extending from each of the left and right hand sides of the linkage support structure is disposed vertically higher than a second of said at least two linkages such that when any one or both of the left and right wheels encounters a surface that causes relative vertical movement between the corresponding wheel support member and the linkage support structure, the corresponding wheel support member maintains an orientation in which the suspended wheel remains in said substantially downward and perpendicular suspension; and a means of self-leveling the suspended wheels after being vertically displaced relative to the linkage support structure such that when one or both of the wheels becomes vertically displaced, the means of self-levelling causes the wheel or wheels to return to an original position once allowed to do so.

* * * * *

UNITED STATES PATENT AND TRADEMARK OFFICE
CERTIFICATE OF CORRECTION

PATENT NO.        : 9,775,756 B2                                    Page 1 of 1
APPLICATION NO.   : 14/338613
DATED             : October 3, 2017
INVENTOR(S)       : Scott Gordon It is certified that error appears in the above-identified patent and that said Letters Patent is hereby corrected as shown below:

In the Claims

Column 13, Line 39, Claim 22, delete "frames;" and insert -- frame; --

Signed and Sealed this
Second Day of January, 2018

Joseph Matal
*Performing the Functions and Duties of the
Under Secretary of Commerce for Intellectual Property and
Director of the United States Patent and Trademark Office*